(12) United States Patent
Gregg et al.

(10) Patent No.: US 7,836,255 B2
(45) Date of Patent: Nov. 16, 2010

(54) CACHE INJECTION USING CLUSTERING

(75) Inventors: Thomas A. Gregg, Highland, NY (US); Rajaram B. Krishnamurthy, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 510 days.

(21) Appl. No.: 11/958,445

(22) Filed: Dec. 18, 2007

(65) Prior Publication Data

US 2009/0157962 A1 Jun. 18, 2009

(51) Int. Cl.
*G06F 12/00* (2006.01)
*G06F 13/00* (2006.01)
*G06F 13/28* (2006.01)

(52) U.S. Cl. .............. 711/122; 711/137; 711/E12.043

(58) Field of Classification Search .................. None
See application file for complete search history.

(56) References Cited

U.S. PATENT DOCUMENTS

| | | |
|---|---|---|
| 2005/0240652 A1 | 10/2005 | Crick |
| 2005/0246500 A1* | 11/2005 | Iyer et al. ............ 711/137 |
| 2006/0095679 A1 | 5/2006 | Edirisooriya |

OTHER PUBLICATIONS

Milenkovic et al., A Performance Evaluation of Cache Injection in Bus-based Shared Memory Multiprocessors, University of Alabama in Huntsville, 2002, http://www.ece.uah.edu/~milenka/docs/milenkovic_conc00.pdf, 12 pages.
Milenkovic, Achieving High Performance in Bus-Based Shared-Memory Multiprocessors, IEEE Concurrency, 2000, http://www.ece.uah.edu/~milenka/docs/milenkovic_conc00.pdf., pp. 36-44.
U.S. Appl. No. 11/958,418, filed Dec. 18, 2007.
U.S. Appl. No. 11/958,424, filed Dec. 18, 2007.
U.S. Appl. No. 11/958,431, filed Dec. 18, 2007.
U.S. Appl. No. 11/958,435, filed Dec. 18, 2007.
U.S. Appl. No. 11/958,440, filed Dec. 18, 2007.

* cited by examiner

*Primary Examiner*—Matt Kim
*Assistant Examiner*—Ralph A Verderamo, III
(74) *Attorney, Agent, or Firm*—Cantor Colburn LLP; Steven Chiu

(57) ABSTRACT

A method and system for cache injection using clustering are provided. The method includes receiving an input/output (I/O) transaction at an input/output device that includes a system chipset or input/output (I/O) hub. The I/O transaction includes an address. The method also includes looking up the address in a cache block indirection table. The cache block indirection table includes fields and entries for addresses and cluster identifiers (IDs). In response to a match resulting from the lookup, the method includes multicasting an injection operation to processor units identified by the cluster ID.

20 Claims, 8 Drawing Sheets

CACHE INJECTION USING CLUSTERING

BACKGROUND OF THE INVENTION

The present disclosure relates generally to data processing and, in particular, to a method, system, and computer program product for cache injection using clustering.

Cache injection is used to inject data into caches within a multiprocessor environment. Flat SMP (Symmetrical Multi-processor) architectures use a snoopy broadcast bus or interconnect. Cache injection schemes for flat SMPs use broadcast to inject values, as locations of cache lines are not available in directories. For NUMA (Non-uniform Memory Access) distributed memory machines and SMP machines, storing input/output (I/O) page addresses for all applications in the system chipset or I/O hub in regular form is also not practical. Additionally, storing all possible I/O page addresses at application start time is also not feasible, as the application may dynamically allocate memory and pages for I/O transactions.

What is needed is a way to provide efficient cache injection using protocols that avoid broadcasts, that are prudent with use of storage for inject-able addresses, and that dynamically attempt to determine useful addresses for injection.

BRIEF SUMMARY OF THE INVENTION

Embodiments of the invention include a method for cache injection using clustering. The method includes receiving an input/output (I/O) transaction at an input/output device that includes a system chipset or input/output (I/O) hub. The I/O transaction includes an address. The method also includes looking up the address in a cache block indirection table. The cache block indirection table includes fields and entries for addresses and cluster identifiers (IDs). In response to a match resulting from the lookup, the method includes broadcasting an injection operation to processor units identified by the cluster ID.

Further embodiments include a system for cache injection using clustering. The system includes an input/output (I/O) system that includes one of a system chipset and an input/output (I/O) hub, the I/O transaction including an address. The system also includes logic executed on the I/O system. The logic performs a method. The method includes receiving an input/output (I/O) transaction at the I/O system and lookup up the address in a cache block indirection table stored on the I/O system, the cache block indirection table including fields and entries for addresses or address ranges and cluster identifiers (IDs). In response to a match resulting from the lookup, the method includes multicasting an injection operation to processor units identified by the cluster ID.

Additional embodiments include a computer program product for cache injection using clustering. The computer program product includes a storage medium readable by a processing circuit and storing instructions for execution by the processing circuit for implementing a method. The method includes receiving an input/output (I/O) transaction at an input/output device that includes a system chipset or input/output (I/O) hub. The I/O transaction includes an address. The method also includes looking up the address in a cache block indirection table. The cache block indirection table includes fields and entries for addresses and cluster identifiers (IDs). In response to a match resulting from the lookup, the method includes broadcasting an injection operation to processor units identified by the cluster ID.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
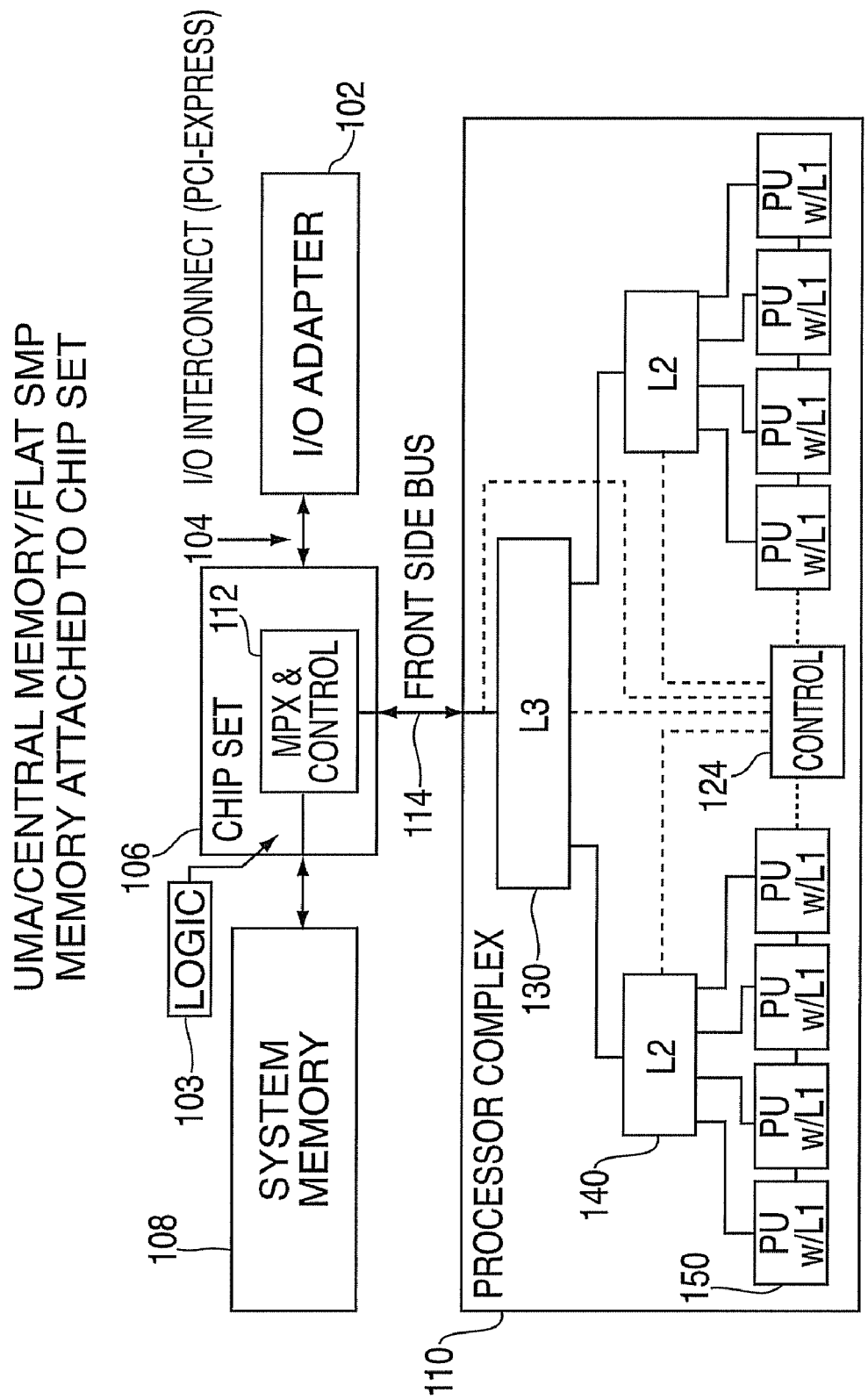
FIG. 1 is a symmetrical multiprocessor architecture (SMP) for use in implementing methods for cache injection using clustering via an I/O hub/chipset in accordance with an exemplary embodiment.

Turning now to FIG. 1, an exemplary system for implementing cache injection using clustering will now be described. The system of FIG. 1 relates to an SMP architecture in which a system memory 108 is coupled with a system chipset 106 or I/O hub (e.g., a system employing Intel® processors). The system includes an I/O adapter 102 coupled to the chipset 106 via a bi-directional I/O interconnect 104 (e.g., PCI Express). The chipset 106 includes a processor and logic 103, and is communicatively coupled to the system memory 108 (also referred to herein as main memory). The chipset 106 is also coupled to a processor complex 110 over a front side bus (FSB) 114. The I/O adapter 102 reads/writes data between the chipset 106 and peripheral devices (not shown).

The processor complex 110 includes multiple processing units, each with a level 1 (L1) cache 150. In the embodiment shown in FIG. 1, the processor complex 110 also includes a level 2 (L2) cache 140 and level 3 (L3) cache 130. The levels 130, 140, and 150 of cache represent a storage hierarchy of the processor complex 110. L3 represents a highest cache level (highest memory latency), and L1 represents a lowest cache level (lowest memory latency) in the hierarchy. It will be understood that any number of cache levels may be implemented in order to realize the advantages of the invention. Three levels L1-L3 are provided for illustrative purposes only and are not to be construed as limiting in scope. In addition, as shown in FIG. 1 for illustrative purposes, multiple processing units (PUs) or groups of processing units may share a common Level 2 and Level 3 storage space in the cache hierarchy.

The processor complex 110 also includes a control unit 124 which manages the traffic (e.g., data transfers) associated with transactions occurring within the complex 110 with respect to the cache hierarchy L1-L3. For example, cache controller 124 tracks the status of cache lines and corresponding addresses in memory for which each cache line is associated.

The chipset 106 may include a group of integrated circuits (chips) that work together to perform various tasks. In an exemplary embodiment, the chipset 106 includes a multiplexer (MPX) and controller 112 for directing the traffic associated with transactions occurring among the I/O adapter 102, the system memory 108, and the processor complex 110 (e.g., read and write transactions). While the embodiment described in FIG. 1 is directed to a chipset 106, it will be understood that other devices may be utilized in implementing the cache injection using clustering (e.g., cards, boards, etc.).

As described above, conventional systems perform cache injection by broadcasting data values of a transaction to each of the caches in a hierarchically organized cache system. This is reflected in FIG. 1 by the solid lines directly interconnecting MPX 112 to L3, L3 to L2, and L2 to L1. The cache injection using clustering using I/O hub/chipset resources described in these exemplary embodiments utilize logic 103 executing on the system chipset 106 (e.g., software/firmware) to perform I/O hub/chipset-side target CPU determination during cache injection to inject data values for a transaction directly into an identified target processor's cache, as shown e.g., by the dotted lines in the processor complex 110 of FIG. 1.

Figure 2:
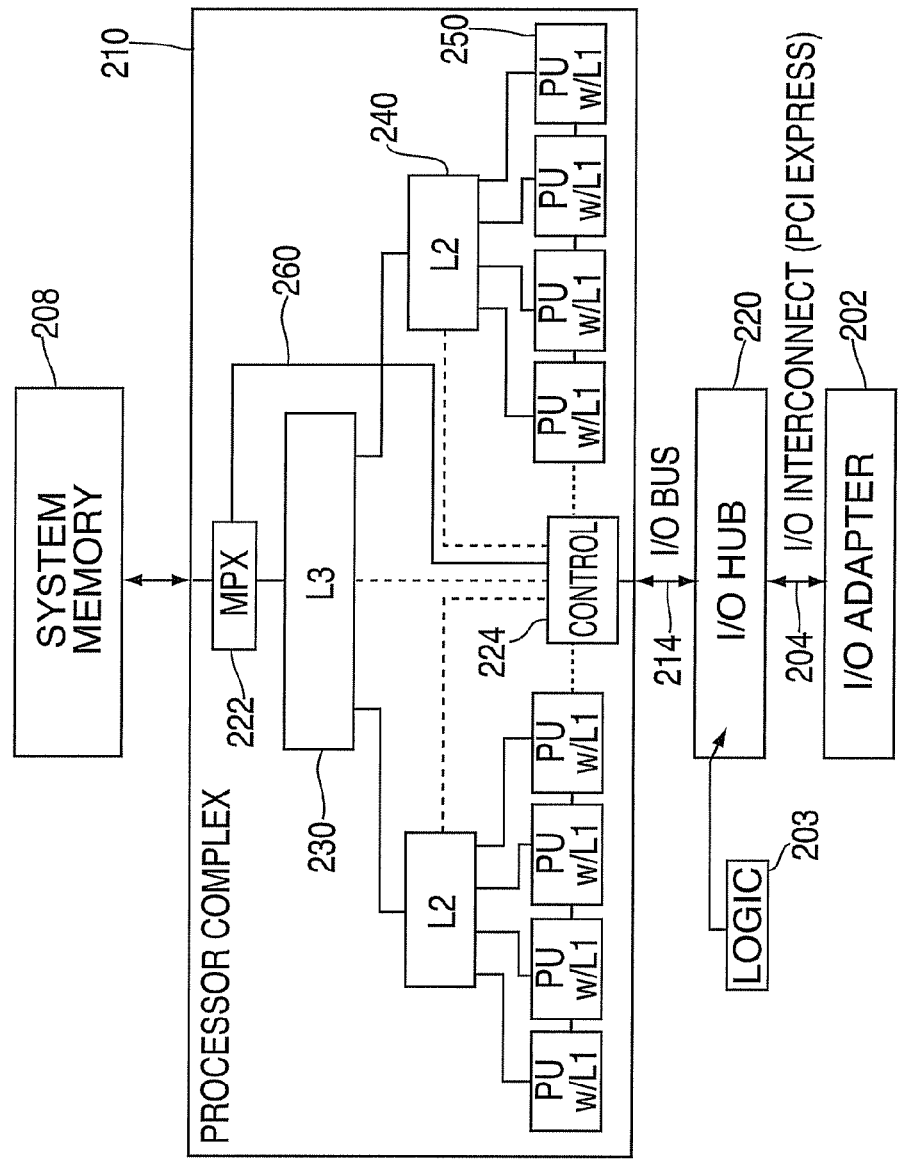
FIG. 2 is a symmetrical multiprocessor architecture (SMP) for use in implementing cache injection using clustering via an I/O hub/chipset in accordance with another exemplary embodiment.

Turning now to FIG. 2, a system upon which the cache injection using clustering may be implemented in accordance with another exemplary embodiment will now be described. The system of FIG. 2 relates to an SMP architecture in which a system memory 208 is coupled with a processor complex 210 (e.g., a system employing AMD® or IBM® System z™ or p™ processors). Various components of the system of FIG. 2 overlap in function with components described above in FIG. 1. To this extent, these components and/or functions will not be described in detail. The system of FIG. 2 includes an I/O adapter 202 in communication with an I/O hub 220 over an I/O interconnect 204 (e.g., PCIe). The I/O hub 220 includes a processor and logic 203, and is communicatively coupled to the processor complex 210 via an I/O bus 214. The processor complex 210, likewise, is communicatively coupled to the system memory 208 (also referred to as main memory). The processor complex 210 includes a cache hierarchy with three levels of cache, namely L1 250, L2 240, and L3 230. The I/O hub 220 communicates with the processor complex 210 via a control unit 224 which directs traffic between the I/O hub 220, the cache hierarchy, and the system memory 208 via a multiplexer 222.

The I/O adapter 202 reads/writes data to the processor complex 210 and the system memory 208 via the I/O interconnect 204, I/O hub 220, I/O bus 214 and MPX 222. For example, in a conventional cache injection process, the data transaction or request is generated in the I/O adapter 102 and distributed over the I/O interconnect 204 to the I/O hub 220 using, e.g., PCI Express protocols. The I/O hub 220 performs a translation (e.g., transforming the PCI Express protocols to those in which the I/O bus 214 will understand) and distributes the translated data over the I/O bus 214 to the control unit 224 where it is sent directly to the L3 cache 230. The cache injection using clustering of the exemplary embodiments utilize logic 203 executing on the I/O hub 220 (e.g., software/firmware) to perform host-side target CPU determination during cache injection, such that the data values in an I/O transaction may be directed injected into a target processor's cache, as opposed to a general broadcast to all of the cache locations in the processor complex 210. This is shown in FIG. 2 by the dotted lines from the control unit 224 representing wires used to activate and target a specific cache.

Figure 3:
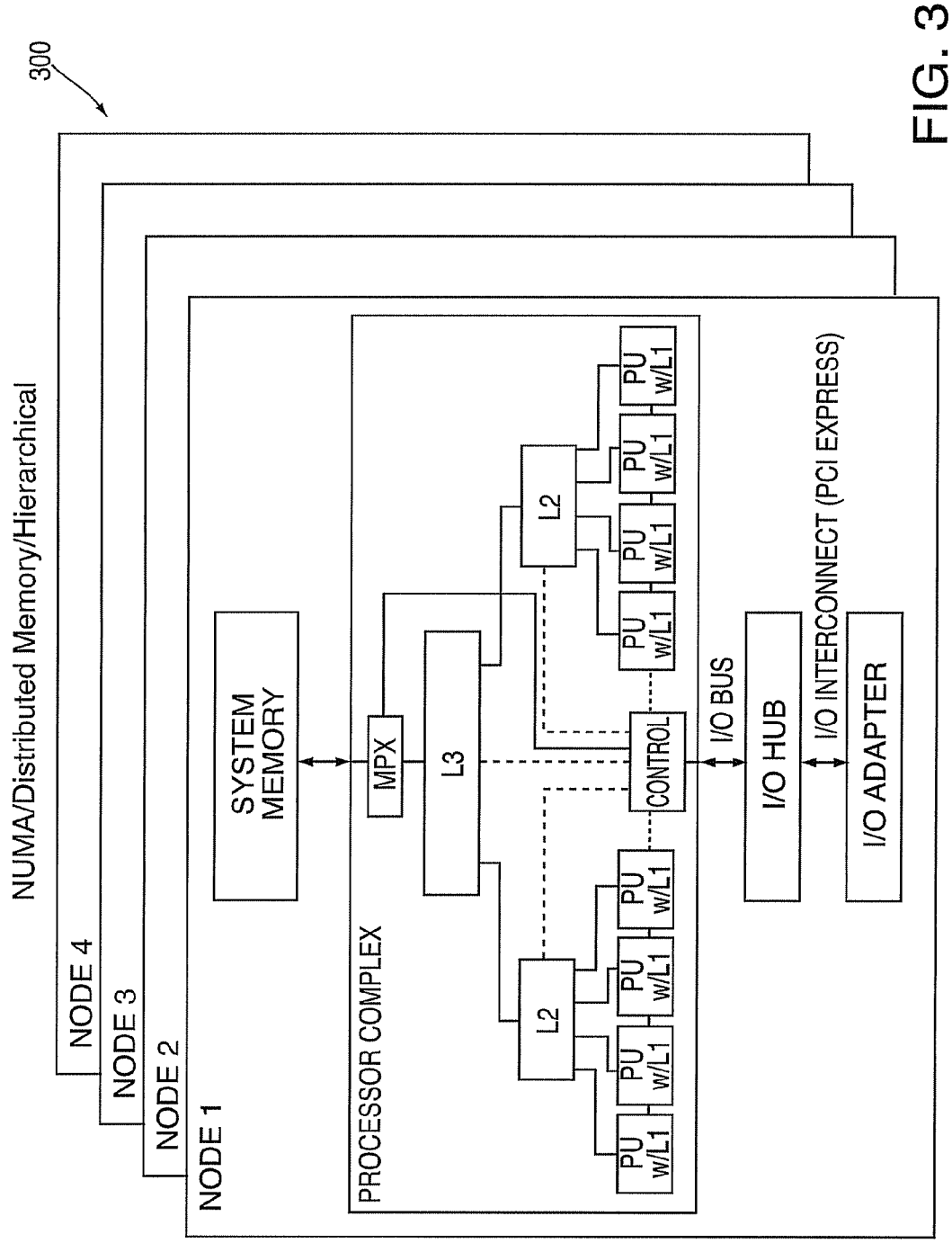
FIG. 3 is a non-uniform memory access (NUMA) architecture with distributed memory for use in implementing cache injection using clustering via an I/O hub/chipset in accordance with yet another exemplary embodiment.

Turning now to FIG. 3, a non-uniform memory access (NUMA) architecture with distributed memory for use in implementing cache injection using clustering will now be described. The system of FIG. 3 includes multiple nodes 300 (Nodes 1-4), which communicate among one another for performing data transactions including the cache injection using clustering described herein. Each of the Nodes 1-4 may include a multiplexer (MPX) (e.g., MPX 222) that steers data to system memory or cache hierarchy in the processor complex. The processor complex for each of Nodes 1-4 are interconnected and communicate with one another to form the NUMA, or distributed, memory model-based machine. Keeping data values coherent in the caches may be implemented, e.g., using scalable directory-based cache coherency techniques or snoopy bus protocols. It will be understood that the cache injection using clustering may be implemented over a system that includes multiple nodes in an SMP architecture as shown, e.g., in FIG. 1 as well. For example, multiple nodes may be interconnected via chipsets of each of the nodes.

Figure 6A:
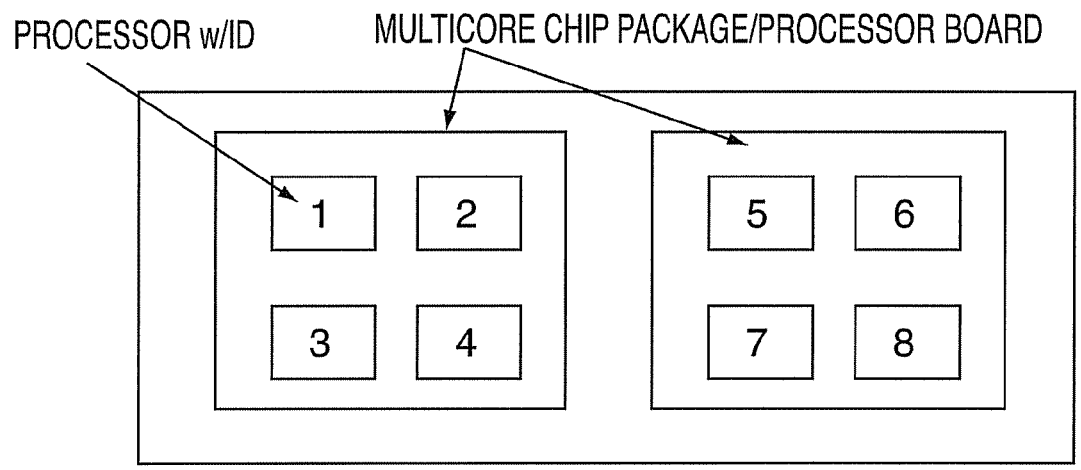
FIG. 6 is a block diagram illustrating clusters of processing units corresponding to the SMP architecture shown in FIG. 2, in accordance with an exemplary embodiment.
Figure 6B:
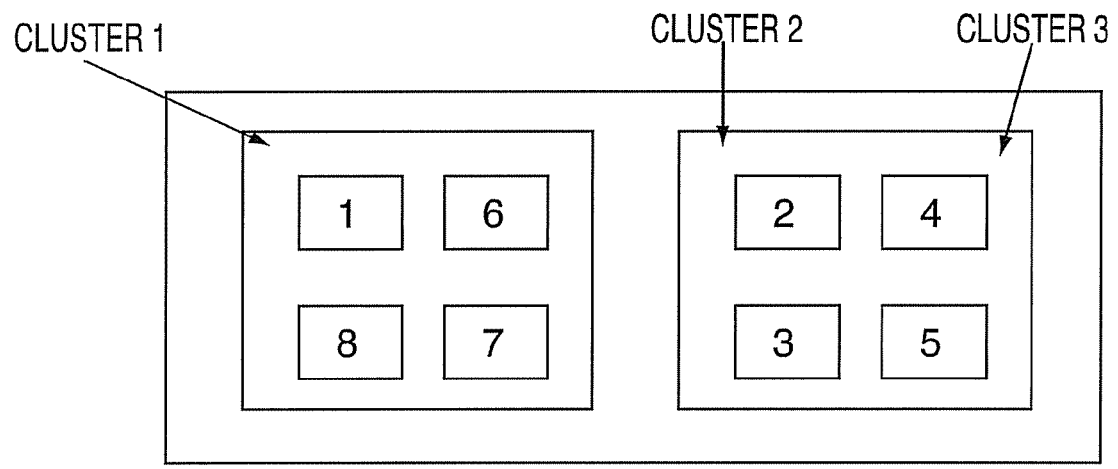

In an exemplary embodiment, the cache injection using clustering enables the chipset 106 to inject values into CPU caches without a broadcast to every CPU cache. This is particularly relevant for the SMP architecture of FIG. 2 where an address can be shared by multiple CPUs 250 simultaneously. Instead of creating an entry for every processor that is likely to share the cache line corresponding to an address, processors are grouped into "clusters". Clusters are simply "virtual" groupings for efficient data structure manipulation without any special relevance to the physical architecture of the machine. As shown in FIG. 6A, a few CPUs from the processor complex 210 of FIG. 2 may be physically co-located on one of a single chip package and processor book/board. These CPUs can be "virtually" grouped or clustered as shown in FIG. 6B. In FIG. 6B, the basis for grouping may be that the grouped CPUs share an address, i.e., at least one cache line corresponding to an address is present in all of the CPU caches belonging to the "virtual" group. It will be understood that in FIG. 3, if directory-based cache coherence is used, simply storing inject-able addresses along with other state bits is sufficient. The cache coherence directory in each node (1-4) stores location information for addresses and their corresponding cache lines. After look up of CPU book numbers (or chip package numbers) for each cluster, an I/O transaction is embedded with a processor book number that identifies each of the processors for a corresponding cluster. An I/O transaction is generated for each processor book number in the cluster. It will be understood that this allows specific CPUs to be targeted by using state storage on the I/O hub or chipset efficiently. CPU targeting avoids cache pollution and uses processor complex bandwidth prudently. In an alternative embodiment of the present invention, a processor number may also be embedded into the I/O transaction. As will be understood by those skilled in the art, a processor book number provides coverage for a set of processors and is a more compact way of representation. In the I/O interconnect 104, e.g., PCI Express, a transaction layer thereof generates header and data for the transaction. The transaction layer header carries this information for memory write PCI transactions. When the transaction reaches the system chipset 106 of FIG. 1, the chipset 106 embeds the processor unit book number in the transaction and directs the transaction to the target processor(s) identified in the transaction as described further herein.

Alternatively, as shown in FIG. 2, when the transaction reaches the control unit 224 of FIG. 2, the I/O hub 224 embeds the processor unit book number in the transaction and directs the entire transaction to the target processor(s) identified in the transaction as described further herein.

Figure 4:
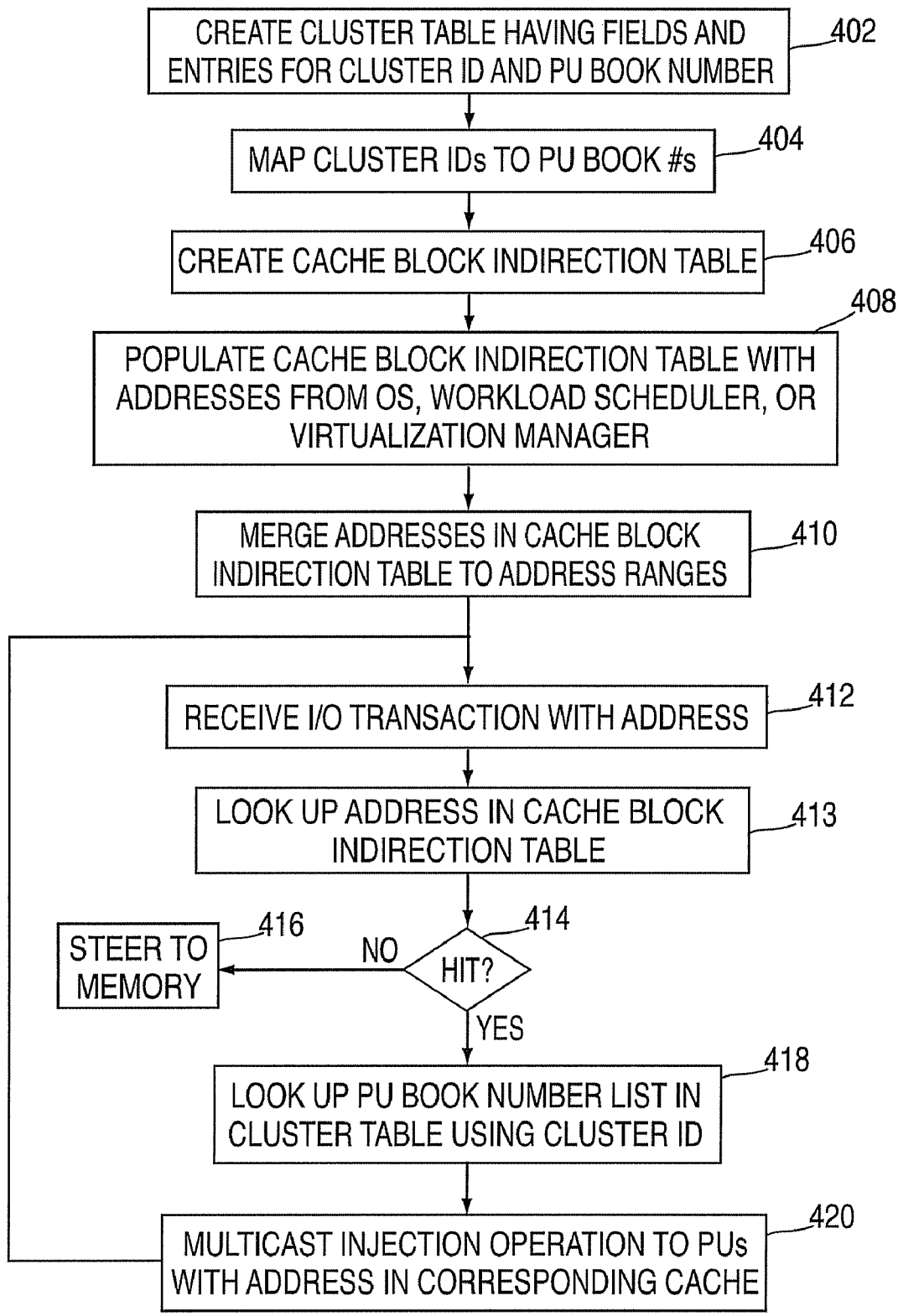
FIG. 4 is a flow diagram describing a process for implementing cache injection using clustering via an I/O hub/chipset in accordance with an exemplary embodiment.
Figure 5:
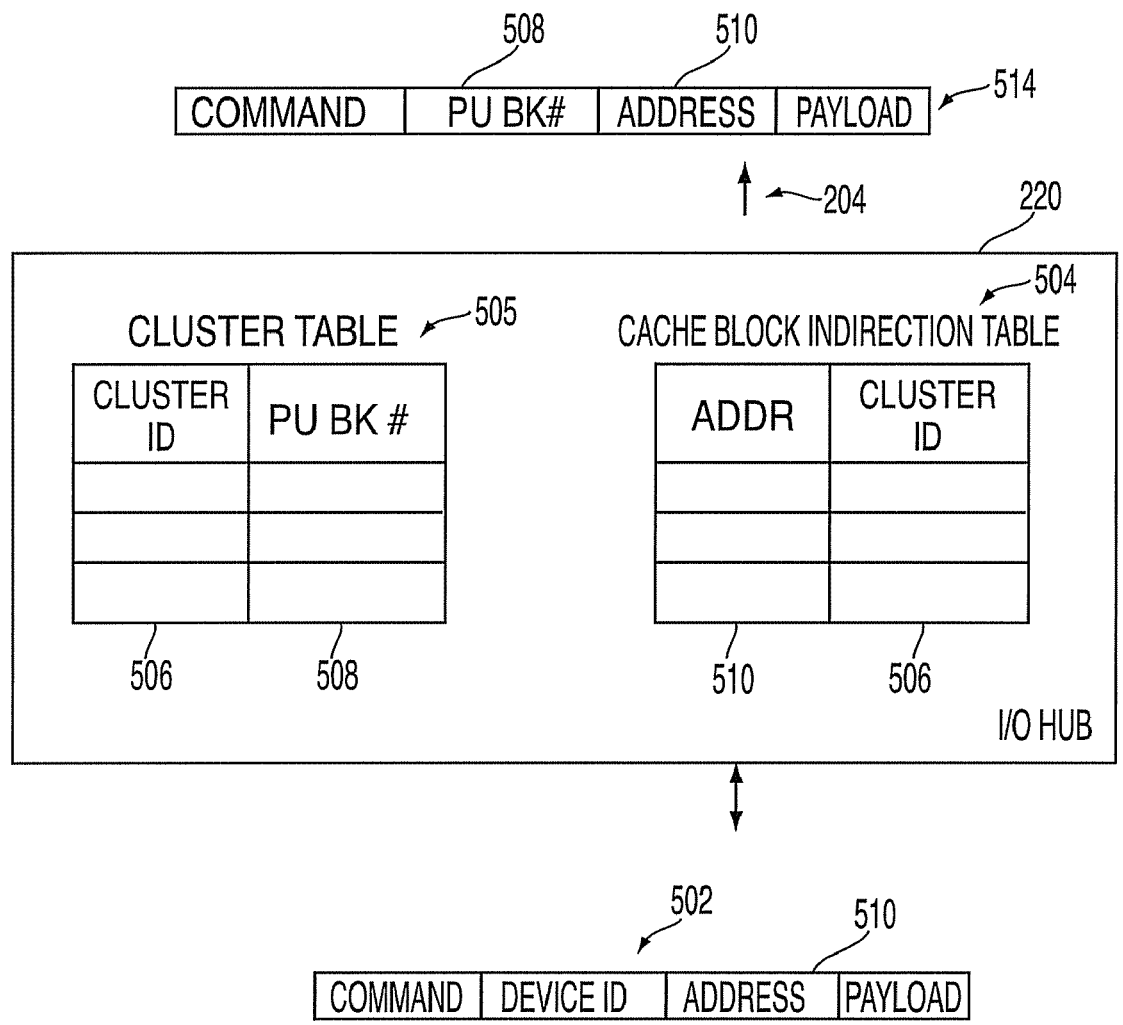
FIG. 5 is a block diagram describing components of an input/output (I/O) hub/chipset used in the system of FIG. 2 in accordance with an exemplary embodiment.

Turning now to FIGS. 4 and 5, an I/O hub (or system chipset 120) and process for implementing the cache injection using clustering will now be described in exemplary embodiments. For purposes of illustration, and by way of non-limiting example, the processes described in FIG. 4 relate to the I/O hub 220 of FIG. 2.

As indicated above, the cache injection using clustering enables I/O host-side methods for target CPU determination for processor units of a specified cluster during cache injection. The host-side methods provide a means to perform I/O transactions using clusters that save state storage on the I/O hub 220 or chipset 120 and avoid cache injection broadcasts in the processor complex 210/110. In an exemplary embodiment, the I/O hub 220 or chipset 120 executes logic 203/103 for implementing the processes described herein.

At step 402, a cluster table 505 is initialized that includes fields and entries for cluster IDs 506 and processor unit (PU) book numbers 508 for each processor in the cache hierarchy 210. Field 508 may be implemented as a linked list of processor book numbers and processor IDs. At step 404, the cluster IDs 506 in the cluster table 505 are mapped to corresponding PU book numbers. This mapping may be performed via the operating system or a workload scheduler for gang-scheduled processes, workload partitioned systems, or virtualized machines.

At step 406, a cache block indirection table 504 is initialized. The cache block indirection table includes fields and entries for addresses or address ranges 510 and cluster IDs 506. In one exemplary embodiment, the entries of the cache block indirection table 504 are populated at runtime by software (e.g., for application processes that are statically pinned to processors or cache affinity scheduled applications) at step 408.

At step 410, addresses in the cache block indirection table 504, which correspond to the same cluster ID, are merged into contiguous address ranges with the entries at runtime. This step may be implemented each time an address is inserted into the cache block indirection table 504. By merging these addresses into contiguous ranges, there is no need to store an address or address range corresponding to every processor unit in the processor complex 210. Thus, the cache block indirection table 504 is more compact and space efficient.

At step 412, the I/O hub 220 (or system chipset 120) receives an input/output (I/O) transaction 502. The I/O transaction 502 includes an address 510. At step 413, the address is compared against the addresses 510 stored in the cache block indirection table 504. If a match is not found at step 414, the I/O transaction data is steered to memory (e.g., memory 208). Otherwise, if a match is found at step 414, the cluster ID 506 for the address 510 is compared against the cluster IDs 506 in the cluster table 505 in order to determine the corresponding processor units associated with the cluster ID at step 418. At step 420, the injection operation is multicast to the processor units which have the address stored in their caches (via the cluster ID).

In an alternative embodiment, the injection operation may be implemented without the use of the cluster table 505. For example, in response to the match identified in step 414, the address 510 from transaction 502 may be multicast to all processor units. In response thereto, the processor units in which the address is stored in its cache may generate and transmit an acknowledgement to the I/O hub 220. At this time, the I/O hub 220 performs cache injection for those processor units in which an acknowledgement has been received. This eliminates the need for a broadcast and cluster storage information but needs a two-phase protocol to detect locations and then target specific caches.

Figure 7:
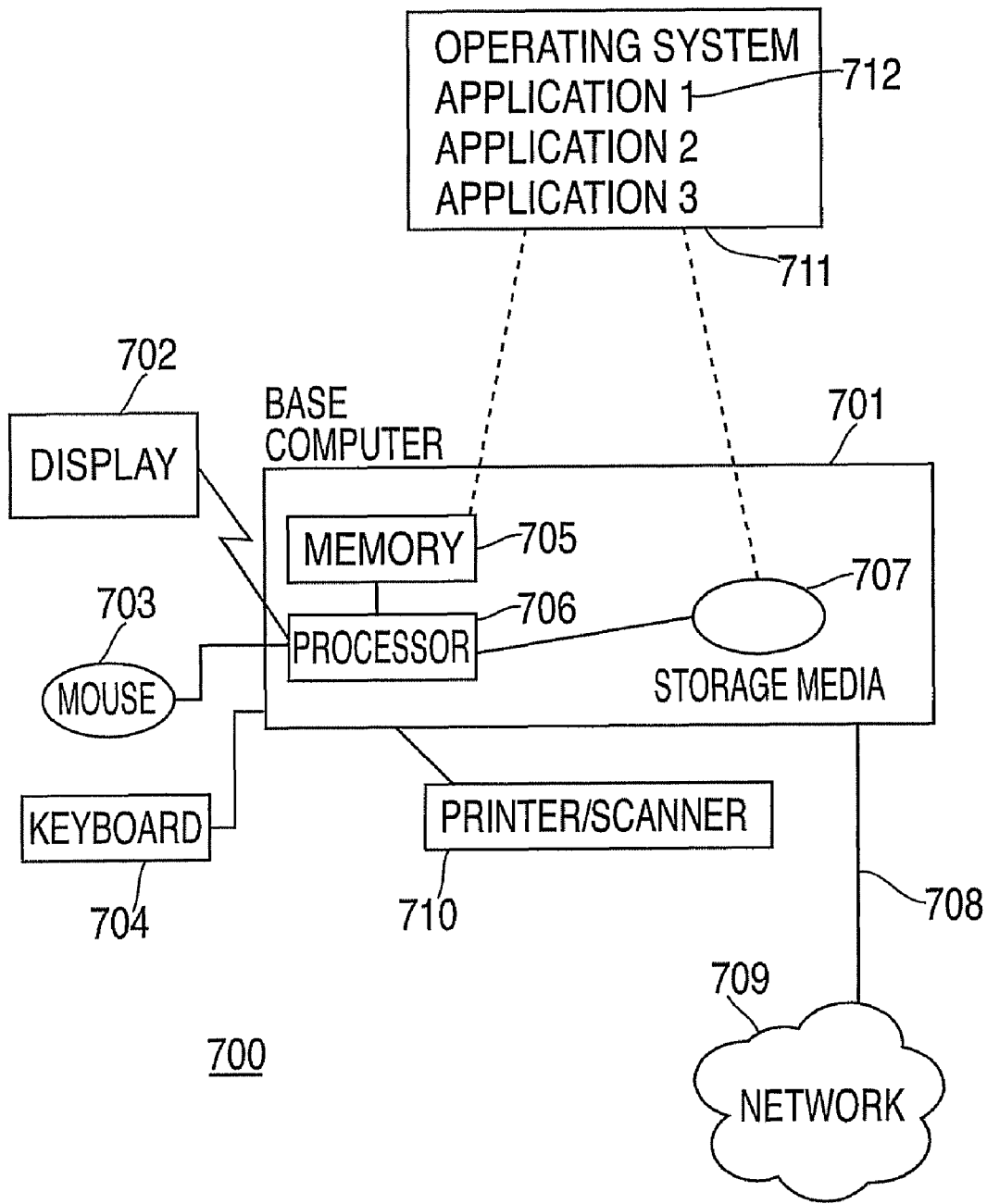
FIG. 7 is a workstation for implementing cache injection using clustering via an I/O hub/chipset in accordance with an exemplary embodiment.

FIG. 7 illustrates a representative workstation or server hardware system in which the present invention may be practiced. The system 700 of FIG. 7 comprises a representative computer system 701, such as a personal computer, a workstation or a server, including optional peripheral devices. The workstation 701 includes one or more processors 706 and a bus employed to connect and enable communication between the processor(s) 706 and the other components of the system 701 in accordance with known techniques. The bus connects the processor 706 to memory 705 and long-term storage 707 which can include a hard drive, diskette drive or tape drive for example. The system 701 might also include a user interface adapter, which connects the microprocessor 706 via the bus to one or more interface devices, such as a keyboard 704, mouse 703, a printer/scanner 710 and/or other interface devices, which can be any user interface device, such as a touch sensitive screen, digitized entry pad, etc. The bus also connects a display device 702, such as an LCD screen or monitor, to the microprocessor 706 via a display adapter.

The system 701 may communicate with other computers or networks of computers by way of a network adapter capable of communicating 708 with a network 709. Example network adapters are communications channels, token ring, Ethernet or modems. Alternatively, the workstation 701 may communicate using a wireless interface, such as a CDPD (cellular digital packet data) card. The workstation 701 may be associated with such other computers in a Local Area Network (LAN) or a Wide Area Network (WAN), or the workstation 701 can be a client in a client/server arrangement with another computer, etc. All of these configurations, as well as the appropriate communications hardware and software, are known in the art.

Figure 8:
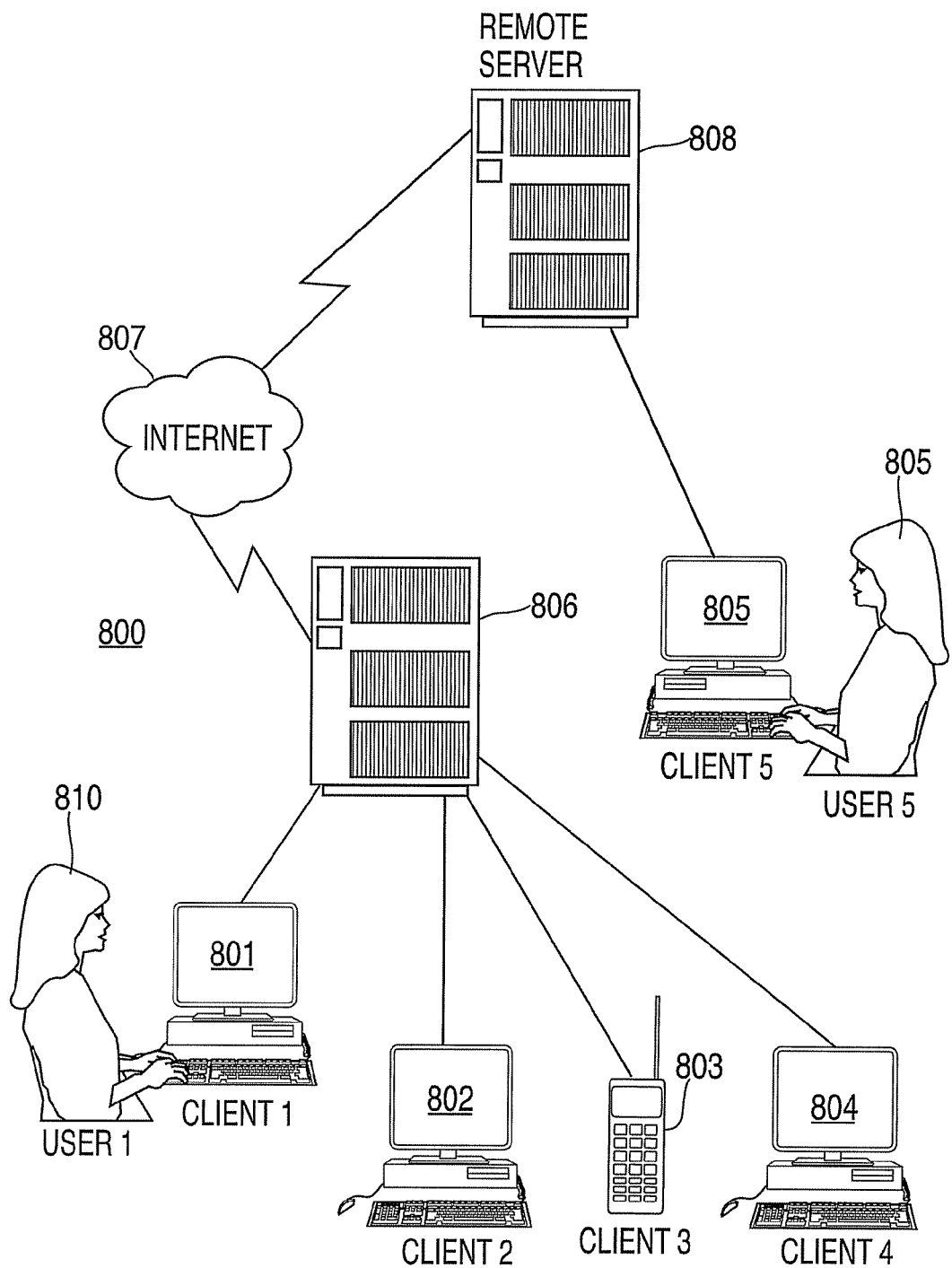
FIG. 8 is a data processing network for implementing cache injection using clustering via an I/O hub/chipset in accordance with an exemplary embodiment.

FIG. 8 illustrates a data processing network 800 in which the present invention may be practiced. The data processing network 800 may include a plurality of individual networks, such as a wireless network and a wired network, each of which may include a plurality of individual workstations 701, 801, 802, 803, and 804. Additionally, as those skilled in the art will appreciate, one or more LANs may be included, where a LAN may comprise a plurality of intelligent workstations coupled to a host processor.

Still referring to FIG. 8, the network may also include mainframe computers or servers, such as a gateway computer (client server 806) or application server (remote server 808 which may access a data repository and may also be accessed directly from a workstation 805). The gateway computer 806 serves as a point of entry into each network 807. A gateway is needed when connecting one networking protocol to another. The gateway 806 may be preferably coupled to another network (the Internet 807 for example) by means of a communications link. The gateway 806 may also be directly coupled to one or more workstations 701, 801, 802, 803, and 804 using a communications link. The gateway computer may be implemented utilizing an IBM eServer zSeries® 600 Server available from IBM Corp.

Software programming code which embodies the present invention is typically accessed by the processor 706 of the system 701 from long-term storage media 707, such as a CD-ROM drive or hard drive. The software programming code may be embodied on any of a variety of known media for use with a data processing system, such as a diskette, hard drive, or CD-ROM. The code may be distributed on such media, or may be distributed to users 810, 811 from the memory or storage of one computer system over a network to other computer systems for use by users of such other systems.

Alternatively, the programming code 711 may be embodied in the memory 705, and accessed by the processor 706 using the processor bus. Such programming code includes an operating system which controls the function and interaction of the various computer components and one or more application programs 712. Program code is normally paged from dense storage media 707 to high-speed memory 705 where it is available for processing by the processor 706. The techniques and methods for embodying software programming code in memory, on physical media, and/or distributing software code via networks are well known and will not be further discussed herein.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for cache injection using clustering, comprising:

receiving an input/output (I/O) transaction at an input/output (I/O) system comprising at least one of a system chipset and an input/output (I/O) hub, the I/O transaction including an address;

looking up the address in a cache block indirection table, the cache block indirection table including fields and entries for addresses or address ranges and cluster identifiers (IDs); and in response to a match resulting from the lookup, multicasting an injection operation to processor units identified by the cluster ID.

2. The method of claim 1, further comprising:

initializing the cache block indirection table; and populating the cache block indirection table with the entries at runtime.

3. The method of claim 2, wherein the entries include at least one of: addresses corresponding to cache affinity scheduled application process (I/O) pages, addresses corresponding to statically pinned application process (I/O) pages, and addresses corresponding to arbitrary input/output (I/O) pages.

4. The method of claim 3, further comprising:

merging contiguous addresses or address ranges into address ranges within the cache block indirection table which correspond to the same cluster ID.

5. The method of claim 4, wherein multicasting the injection operation includes:

multicasting the received address that matches with the merged address ranges in the cache block indirection table to all processor units for the cluster ID;

receiving an acknowledgement from those processor units in which the address is stored in corresponding caches; and performing cache injection for those processor units in which an acknowledge has been received.

6. The method of claim 1, further comprising:

creating a cluster table including fields and entries for the cluster IDs and processor unit (PU) book numbers for each processor in a cache hierarchy;

mapping the cluster IDs in the cluster table to corresponding PU book numbers;

in response to the match, looking up the cluster ID for the address in the cluster table; and performing cache injection for the address to the processor units identified in the cluster table.

7. The method of claim 6, wherein the cluster IDs are mapped to corresponding processor unit book numbers via at least one of:

an operating system;

a workload scheduler; and a virtualization system manager.

8. The method of claim 1, wherein the I/O system operates in a symmetrical multiprocessor architecture.

9. The method of claim 1, wherein the I/O system operates in a non-uniform memory access architecture.

10. A system for cache injection using clustering, comprising:

an input/output (I/O) system comprising at least one of a system chipset and an input/output (I/O) hub, the I/O transaction including an address; and logic executed on the I/O system, the logic performing:

receiving an input/output (I/O) transaction at the I/O system;

looking up the address in a cache block indirection table stored on the I/O system, the cache block indirection table including fields and entries for addresses or address ranges and cluster identifiers (IDs); and in response to a match resulting from the lookup, multicasting an injection operation to processor emits identified by the cluster ID.

11. The system of claim 10, wherein the logic further performs:

initializing the cache block indirection table; and populating the cache block indirection table with the entries at runtime.

12. The system of claim 11, wherein the entries include at least one of: addresses corresponding to cache affinity scheduled application process (I/O) pages, addresses corresponding to statically pinned application process (I/O) pages, and addresses corresponding to arbitrary input/output (I/O) pages.

13. The system of claim 12, wherein the logic further performs:

merging contiguous addresses or address ranges into address ranges within the cache block indirection table which correspond to the same cluster ID.

14. The system of claim 13, wherein multicasting the injection operation includes:

multicasting the received address that matches with the merged address ranges in the cache block indirection table to all processor units for the cluster ID;

receiving an acknowledgement from those processor units in which the address is stored in corresponding caches; and performing cache injection for those processor units in which an acknowledge has been received.

15. The system of claim 10, wherein the logic further performs:

creating a cluster table including fields and entries for the cluster IDs and processor unit (PU) book numbers for each processor in a cache hierarchy;

mapping the cluster IDs in the cluster table to corresponding PU book numbers;

in response to the match, looking up the cluster ID for the address in the cluster table; and performing cache injection for the address to the processor units identified in the cluster table.

16. The system of claim 15, wherein the cluster IDs are mapped to corresponding processor unit book numbers via at least one of:

an operating system;

a workload scheduler; and a virtualization system manager.

17. A computer program product for cache injection using clustering, the computer program product comprising:

a storage medium readable by a processing circuit and storing instructions for execution by the processing circuit for implementing a method, the method comprising:

receiving an input/output (I/O) transaction at an input/output (I/O) system comprising at least one of a system chipset and an input/output (I/O) hub, the I/O transaction including an address;

looking up the address in a cache block indirection table, the cache block indirection table including fields and entries for addresses or address ranges and cluster identifiers (IDs); and in response to a match resulting from the lookup, multicasting an injection operation to processor units identified by the cluster ID.

18. The computer program product of claim 17, further comprising instructions for implementing:

initializing the cache block indirection table; and populating the cache block indirection table with the entries at runtime.

19. The computer program product of claim 18, wherein the entries include at least one of: addresses corresponding to cache affinity scheduled application process (I/O) pages, addresses corresponding to statically pinned application process (I/O) pages, and addresses corresponding to arbitrary input/output (I/O) pages.

20. The computer program product of claim 19, further comprising instructions for implementing:

merging contiguous addresses or address ranges into address ranges within the cache block indirection table which correspond to the same cluster ID.

* * * * *